Oct. 31, 1967 — C. S. THOMPSON ET AL — 3,350,037
AIRCRAFT LAUNCHING AND ARRESTING GEAR
Filed June 3, 1965 — 3 Sheets-Sheet 1

INVENTORS
CHARLES S. THOMPSON
BY RUSSELL J. NEFF

Tilbery & Body
ATTORNEYS.

Oct. 31, 1967  C. S. THOMPSON ET AL  3,350,037
AIRCRAFT LAUNCHING AND ARRESTING GEAR

Filed June 3, 1965  3 Sheets-Sheet 2

INVENTORS
CHARLES S. THOMPSON
BY RUSSELL J. NEFF

*Tilbery & Body*
ATTORNEYS

Oct. 31, 1967    C. S. THOMPSON ET AL    3,350,037
AIRCRAFT LAUNCHING AND ARRESTING GEAR
Filed June 3, 1965                                   3 Sheets-Sheet 3

INVENTORS
CHARLES S. THOMPSON
RUSSELL J. NEFF
BY
Tilberry & Body
ATTORNEYS

United States Patent Office 3,350,037
Patented Oct. 31, 1967

3,350,037
AIRCRAFT LAUNCHING AND
ARRESTING GEAR
Charles S. Thompson, Burlington, N.J., and Russell J.
Neff, Park Ridge, Ill., assignors to E. W. Bliss Company, Canton, Ohio, a corporation of Delaware
Filed June 3, 1965, Ser. No. 461,123
7 Claims. (Cl. 244—63)

This invention pertains to the art of aircraft launching and arresting gear for assisting aircraft take-offs or landings on short runways and more particularly to such gear employing a rotatable reel for storage of the aircraft purchase tape.

More specifically, the invention will be described with reference to a rotary arresting gear installation utilizing a flat purchase tape woven from synthetic yarns such as nylon, however, it will be appreciated that other materials capable of formation into longitudinal load bearing strands suitable for a tape-like construction may be used without departing from the invention, such as other high strength textile yarns or metallic threads and that the invention applies equally to arresting or launching gear whether employing a rotatable reel or not as the energy conversion means.

In rotary reel type installations employing a purchase tape, the tape is stored on the rotatable reel as a circumferential winding and is paid out and rewound through suitable guide sheaves and ducts when servicing each aircraft. It has been found that the tape weave must provide a rather stiff, low stretch construction having a hard edge to prevent the edges from folding over when the tape is under load and is being pulled through the sheaves and guide ducts of the payout and rewind equipment. Also, if the tape is excessively stretchable or the edges too soft, there is a tendency for it to buckle under load when in a stack of substantial radial thickness on the reel, thus requiring an impractical amount of mechanical restraint from the reel sidewalls.

Experience has shown that the number one enemy to purchase tape life is abrasion and wear caused by dragging it along the surface of the runway or aircraft carrier deck. This becomes apparent when it is appreciated that several hundred feet of tape are being dragged along the runway in servicing each aircraft and when any portion thereof becomes worn or frayed, the entire tape complement affected eventually must be replaced for obvious reasons of safety.

Heretofore the fabric tape utilized in arresting gear was of the weave construction described in United States Patent No. 2,977,076, issued Mar. 28, 1961, to the assignee of the present invention. In such tape longitudinally extending strength members were interwoven with transverse filler strands usually in a three ply construction having a high ratio of transverse to longitudinal strands. One set of binder strands were interwoven longitudinally between the top and center filler strands and another set between the bottom and center filler strands tying the layers together; the binder strands having a considerable effect in strengthening the tape inasmuch as they only went half way through the tape and were entwined with the transverse filler strands. This particular construction provides a high breaking strength and considerable edge wear resistance owing to the high ratio of transverse filler strands and the additional rigidity provided by the separate binders.

Edge abrasion is especially a problem with tape having a low ratio of transverse to longitudinal strands such as in stuffer weave tape. This is tape having a core of continuous, longitudinally extending load bearing strands called stuffer warp and a woven envelope or protective casing on the outside. Case warp members are sinuously interwoven with a transverse weft bound tightly to the core by longitudinally extending binder strands. The protective casing insulates the stuffer warp from runway abrasion and so long as the tape lies flat on the runway and is not in severe contact anywhere on its edges there is little problem. In practice however, the tape must accept the abuses of edge contact on the runway and in the guide ducts of the gear and since the edges must be rather hard and inflexible, the concomitant wear eventually breaks down the edge at a particular location. This permits a bundle of stuffer warp to slip out of the side of the tape at the worn spot thus exposing some of the load bearing members of the tape to abrasion. Once these exposed strands are worn through, the tape is weakened due to the removal of some of the stuffer warp from service and since the tape is now opened, the core is exposed to moisture and dirt further tending to weaken the interior stuffer warp.

A purpose of the present invention is to overcome these and other difficulties by providing purchase tape having a woven edge construction especially designed to resist abrasion yet retain the required stiffness for use in aircraft launching and arresting applications.

In accordance with the broadest aspect of the invention, a linear purchase tape is provided considerably wider than it is thick so as to permit coiling upon itself and comprises longitudinally extending strength members, a weft element surrounding the strength members extending transversely thereto and laterally beyond the opposite edge strength members to define parallel marginal edges of the purchase tape and members extending longitudinally in the edge in close packed relationship so as to substantially fill out and harden the marginal edges and protect the strength members from damage.

Further in accordance with the invention, longitudinally extending, laterally spaced binder strands are interwoven with the weft elements across the breadth of the purchase tape so as to pass vertically back and forth through the strength members separating them into longitudinally extending strength bundles.

Further in accordance with the invention, strength members are eliminated from between the first two binder strands adjacent each marginal edge to prevent exposure of strength members in event of excessive edge abrasion.

Further in accordance with the invention, casing warp members are longitudinally interwoven with the weft elements completely across the top and bottom of the purchase tape to provide a protective envelope for the strength members, the edge warp members in the marginal edges consisting of a synthetic yarn made of a coarser filament than the casing warp members and being twisted a greater number of turns per inch to provide increased resilience and edge abrasion resistance.

In accordance with a further aspect of the invention, there is provided a method of making a woven purchase tape comprising the steps of providing a core of longitudinally extending strength members considerably wider than it is thick, passing a transverse weft element around the core and advancing it continuously in a helical manner lengthwise of the core leaving it loose at the marginal edges, weaving longitudinally extending edge warp members on the weft element to enclose the marginal edges, and laterally shrinking the transverse weft element so as to bunch the edge warped members together thereby hardening the marginal edges.

The principal object of the invention is the provision of a purchase tape having a woven edge of unique design which prevents exposure of longitudinal strength members of the tape under conditions of normal edge abrasion in aircraft launching and arresting applications.

A further object of the invention is to provide a woven edge sufficiently hard to withstand edge pressures without rolling or folding.

Another object of the invention is to provide an edge weave pattern in which the warp members in the edge are adjusted by the size of yarn and by the number of turns per inch to provide maximum wear resistance at the marginal edges of the tape.

These and other objects will be more apparent by referring to the following description and drawings wherein.

Figure 1:
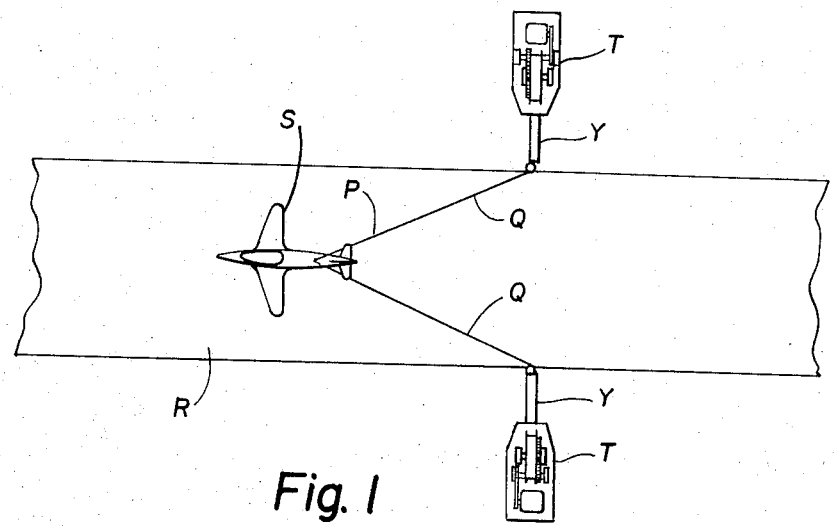
FIGURE 1 is a schematic view of an aircraft arresting installation having an arresting engine on opposite sides of the runway incorporating a purchase tape constructed in accordance with the invention to hold the opposite ends of a pendant stretched across the runway to intercept the aircraft.

Referring now to the drawings wherein the figures illustrate a preferred embodiment of the invention only and are not for the purpose of limiting same, FIGURE 1 shows in more or less schematic form an expeditionary type of arresting installation. It will be appreciated that while the invention is described herein with respect to such an arresting gear, it is equally applicable to the semi-permanent types of equipment as described in United States Patent No. 3,142,458, issued July 28, 1964.

Figure 2:
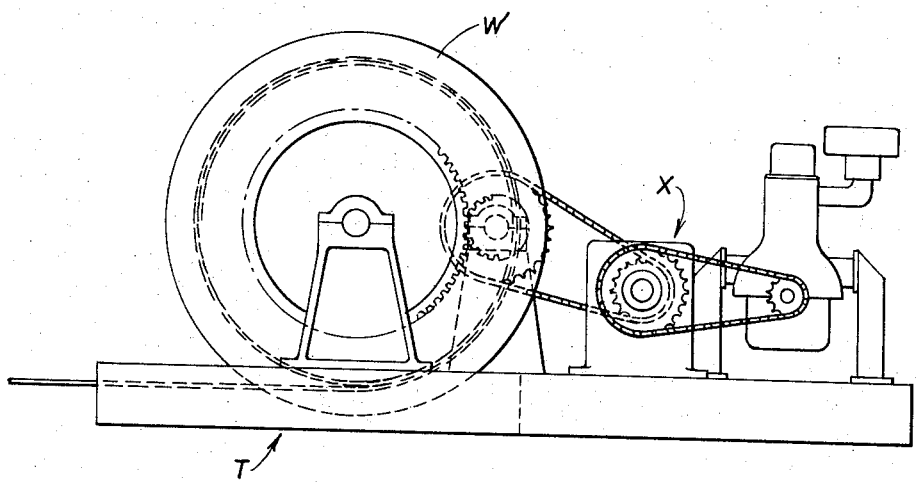
FIGURE 2 is an elevational view of an arresting engine depicted in FIGURE 1 showing the rotatable reel used for storing the purchase tape.

In the arrangement of FIGURE 1, a steel pendant P is stretched transversely across the runway R in the glide path of an incoming plane S having a tail hook adapted to engage the pendant P which is connected at each end to an arresting unit T, installed on opposite sides of the runway R. Providing the connection between each end of the pendant P and each arresting unit T is a purchase tape Q which restrains the aircraft S as it is gradually brought to a safe controlled stop by the arresting units T. In the battery position, the pendant P is stretched taut across the runway R and the purchase tape Q is wound on a reel W of the respective arresting units T. Upon engagement by an incoming plane S, the tape Q is paid out through guide ducts and sheaves generally indicated at Y and is dragged along the runway R with the pendant P and aircraft S for the full runout distance. After the aircraft S is brought to rest the pendant P is unhooked and the rewind mechanism X of each arresting unit T is engaged to rotate reels W in the opposite direction causing the tape Q to be wound back up. The tape Q is coiled upon itself as a circumferential stack on the reels W as shown in FIGURE 2.

Experience has shown that the most advantageous form of purchase members is a flat tape of woven synthetic fibers having sufficient strength to withstand the high tension forces to which the fibers must be subjected during an arrestment or launching plus a low stretch characteristic and other properties dictating the use of a woven synthetic tape in such applications as described in U.S. Reissue Patent No. 25,406, issued June 25, 1963.

Figure 3:
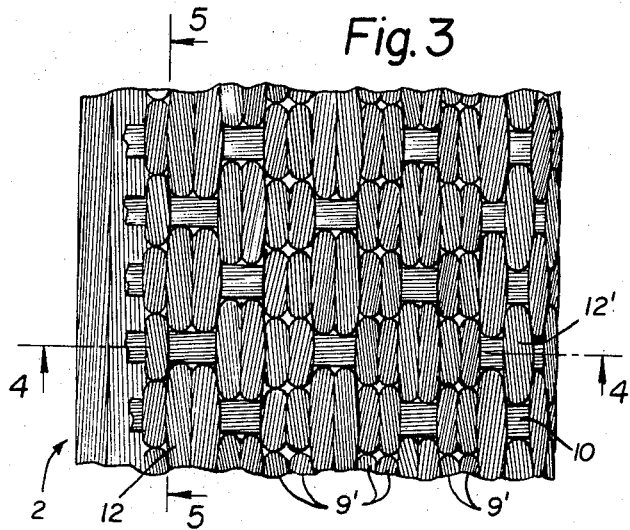
FIGURE 3 is a plan view of a portion of one marginal edge of the tape showing the protective casing partially broken away to reveal the stuffer warp.
Figure 5:
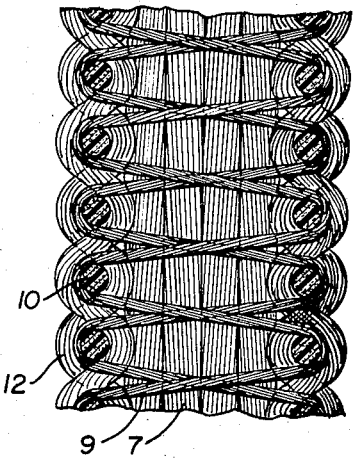
FIGURE 5 is a longitudinal sectional view showing the weave pattern of the binder strands taken along line 5—5 of FIGURE 3.
Figure 4:
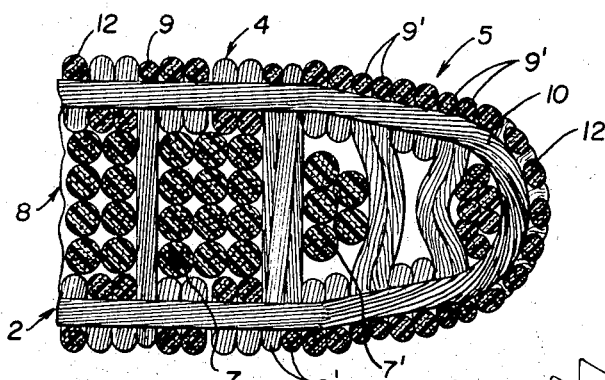
FIGURE 4 is a partial cross-sectional view showing the marginal edge construction taken along line 4—4 of FIGURE 3.

Referring to FIGURES 3, 4 and 5, the tape Q as constructed in accordance with the invention generally comprises a core 2, a protective case 4 and marginal edges 5. Extending through the core 2 in a lengthwise manner are a plurality of continuous load bearing strands 7 known as stuffer warp. The stuffer warp 7, while depicted in FIGURE 4 as discrete strands with spaces therebetween, would in the actual case, be a multitude of filaments tightly packed in longitudinally extending strength bundles 8 laterally spaced across the tape except for the edges 5 for reasons to be explained hereinafter. It is important that the stuffer warp 7 be protected from abrasion as much as possible since separation of a strength bundle 8 would effectively remove from service a principal load bearing unit of the tape. For this reason the protective case 4 is provided.

Figure 6:
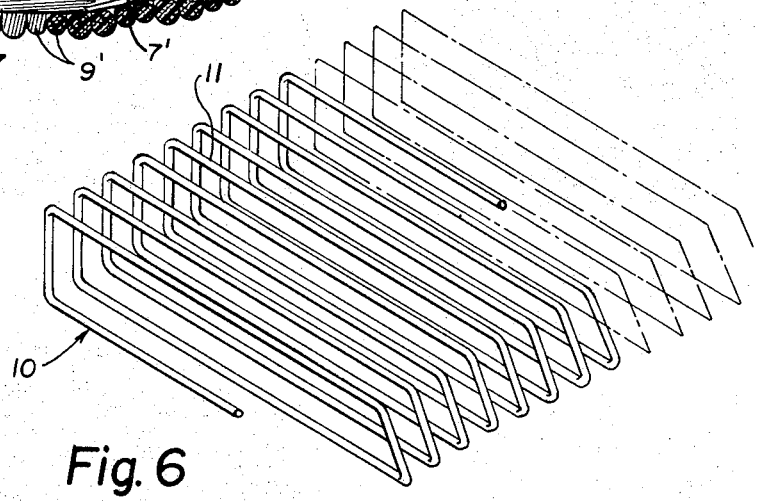
FIGURE 6 is a diagram depicting the weave pattern of the weft element or filler strand which is woven around a core of the stuffer warp.

The foundation for the protective case 4 is a continuous weft element 10 which is wrapped around the core 2 in a helical manner as depicted in FIGURE 6. Two binder strands 9 are woven in longitudinally extending pairs between each strength bundle 8 passing through the core 2 and over opposite adjacent horizontal portions 11 of the weft element 10 in a sinuous manner as depicted in FIGURE 5.

The body of the casing 4 consists of case warp 12 sinuously interwoven with the horizontal portions 11 of the weft element 10 across the top and bottom of the tape Q to enclose the strength bundles 8.

So long as tape Q is flat on the runway and not in severe contact anywhere on its edges there is little problem of wear and abrasion with the stuffer weave construction. In practice however, the tape must accept the abuses of edge contact on the runway. As may be appreciated, if abrasion of the edge continues, a portion of an outer strength bundle will become exposed at the side of the tape and continued abrasion of the exposed strands will eventually cause them to separate thus weakening the tape.

The edges should also be hard and relatively stiff so as to negotiate the sheaves and other structures of the arresting and launching gear without rolling over. This dictates a generally rounded or blunt construction instead of a sharp or tapered shape.

In accordance with the invention, a novel woven edge construction is provided in which the strength bundles 8 are eliminated from the marginal edge beads 5. The edge bead 5 is preferably as wide as the tape is thick to provide the greatest resistance to abrasion in the transverse direction while maintaining the required hardness. As shown in FIGURES 3 and 4, double binder strands 9' mark the beginning of the edge bead and provide an initial doubled thickness barrier to protect the outer strength bundles 8. Similarly the remaining binder strands 9' in the edge bead 5 are doubled for maximum resistance to abrasion. Stuffer warp 7' is provided to give body to the edge in the transition from the thickness of core 2 to the rounded shape of edge bead 5 and also act as a buffer for the main strength bundles 8. The load requirements of the tape are met without the stuffer warp 7' so that even if these warp strands are separated the tape is not rendered unserviceable or unsafe. Longitudinal extending edge warp 12' is sinuously interwoven with the transverse weft member 10 in the same manner as the case warp 12.

In accordance with a further aspect of the invention, the filaments of edge warp 12' are coarser and the yarns twisted a greater number of turns per inch than in the case warp 12. For example, each edge warp strand 12' in the preferred embodiment consists of three 840 denier yarns twisted together in a helical manner at 4.5 turns per inch, i.e. approximately 9,000 meters of one yarn will weigh 840 grams. Each yarn is composed of 68 filaments. The case warp 12 also consists of three ply 840 denier yarn, but in contrast, is twisted only 2.5 turns per inch and has 140 filaments per each yarn. Thus while each yarn has approximately the same denier, the size of the filament in the case warp 12 is much smaller (approximately one-half the size) than the filament used in the edge warp 12'. The greater number of turns per inch of the edge warp 12' and the coarser filaments provide additional protection against abrasion for the edge beads 5 due primarily to the greater resilience of the coarser filaments and the excess material built into the edge due to the increased number of turns per inch. Each edge bead 5 contains in cross section 29 or 30 edge warp ends resulting in a bunching toward the center as shown in FIGURE 4. It should be appreciated that the example given is merely to illustrate the preferred embodiment of the invention and, if desired, the number of turns per inch, size of filament and number of edge warp 12' strands may be varied to suit particular requirements. While the edge bead 5 is shown in FIGURE 4 with open voids, it would in the actual case be a closed, tightly packed, hard construction. The appearance of voids in the final construction of the tape is thus misleading but felt necessary to aid in describing the woven construction.

Figure 7:
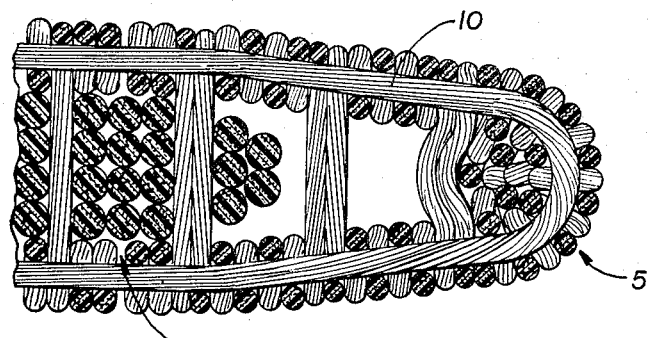
FIGURE 7 is a view similar to FIGURE 4 showing the condition of the marginal edge portion of the tape prior to being passed through a treating bath taken along line 7—7 of FIGURE 8.
Figure 9:
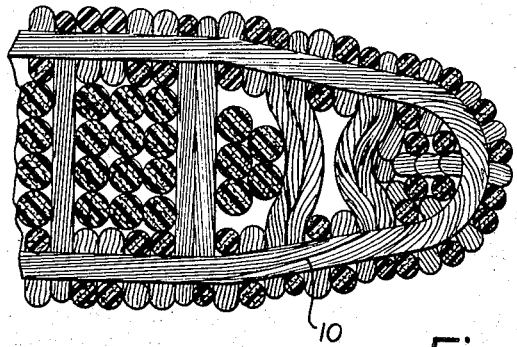
FIGURE 9 is a view similar to FIGURES 4 and 7 showing the condition of the marginal edge at an intermediate stage of treatment taken along line 9—9 of FIGURE 8.
Figure 8:
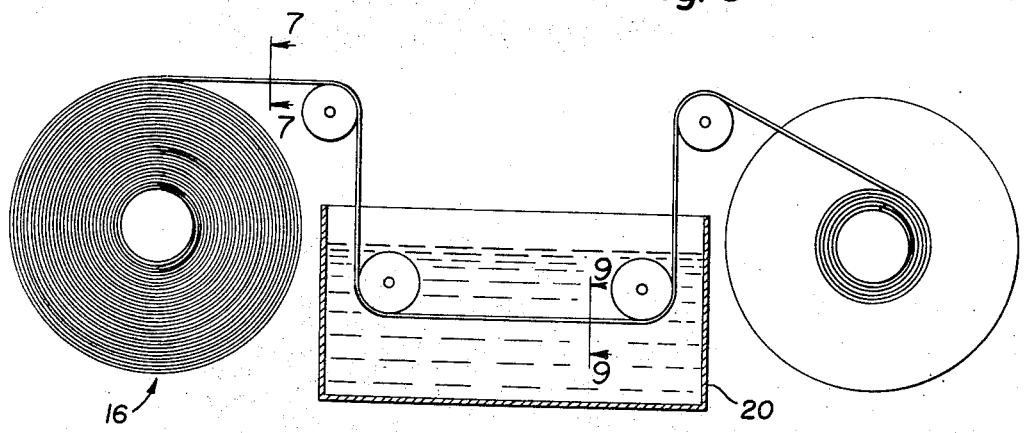
FIGURE 8 is a diagram depicting the treating of the woven tape in a treating bath.

As the tape leaves the loom, the edge beads 5 do not have a hard construction as depicted in FIGURE 4 but instead are loose as depicted in FIGURE 7. The edge beads 5 are tightened and rounded in the process of treating the tape Q as represented schematically in FIGURE 8 where the tape Q is fed from a spool 16 through a tank 20 containing a vinyl solution and water for wetting and impregnating the yarn. The wetting of the tape causes a shrinkage of the transverse weft member 10 eliminating the edge looseness. An intermediate shrunk construction is shown in FIGURE 9 where the edge bead is partially compacted and hardened. After drying, the edge bead is fully shrunk and takes the final shape of FIGURE 4. Transverse weft member 10 may be of any material which shrinks upon becoming wet. For example, nylon will pick up as much as 2 percent water in 24 hours of immersion at 25° C.

Having now described the invention and the preferred embodiment thereof, it will be appreciated that modifications may be made by persons skilled in the art without departing from the invention as defined in the appended claims except insofar as limited by prior art.

Having thus described our invention, we claim:

1. A fabric purchase tape considerably wider than it is thick including a linear body portion having a majority of longitudinally to transversely extending strands comprising
   load bearing strands extending longitudinally throughout the tape for transmitting forces therethrough and transverse strands extending across the body portion laterally beyond the load bearing strands to define parallel marginal edges on opposite sides of the body portion and
   a woven bead formed in each marginal edge composed of
   a plurality of edge warp strands interwoven longitudinally with the marginal edge portions of said transverse strands in a ratio of longitudinal to transverse strands sufficiently high to form a hardened bead for protecting said load bearing strands.

2. A fabric purchase tape according to claim 1 wherein said transverse strands are formed as a continuous element advancing longitudinally in a helical manner with respect to the body portion surrounding said load bearing strands in a stuffer weave construction.

3. A fabric purchase tape according to claim 2 wherein additional load bearing strands are positioned in each marginal edge in excess of the number required for maximum tape load, said additional strands being situated as a buffer between said edge bead and the outer side load bearing strands of said body portion.

4. A tape system for assisting aircraft in the process of landing or taking off from a runway comprising
   an aircraft engaging member,
   rotary energy conversion gear comprising purchase tape payout reel means,
   a purchase tape connected to said aircraft engaging member and adapted to be stored as a continuous coil on said reel means and to be paid out or rewound therefrom in servicing an aircraft, said purchase tape comprising
   a core of longitudinally extending load bearing strands running endlessly throughout the length of said tape for transmitting forces between said reel means and aircraft and
   a casing surrounding said core composed of transverse strands which extend laterally beyond the opposite sides of said core to define parallel marginal edges for said tape and
   a woven edge bead formed in said marginal edges including edge warp strands interwoven longitudinally with the marginal edge portions of said transverse strands at a ratio of longitudinal to transverse strands sufficiently high to form a hard packed bead for protecting said core from runway abrasion.

5. A tape system according to claim 4 wherein casing warp strands are interwoven longitudinally with said transverse strands completely overlying said core between the marginal edges of the tape, the number of edge warp strands per unit of cross sectional area of the tape being higher than the casing warp strands.

6. A tape system according to claim 5 wherein said edge warp strands are composed of coarser filaments twisted to a greater number of turns per inch than said casing warp strands.

7. The method of making a fabric purchase tape of the type described in claim 1 including the steps of
   providing a body of longitudinally extending load bearing strands extending completely throughout the length of the tape,
   passing a transverse filler strand continuously around the body and advancing it in a helical manner lengthwise of the tape while leaving it loose at the marginal edges,
   weaving longitudinally extending edge warp strands into the marginal edge portions of the transverse filler strand and
   shrinking the transverse filler strand so as to bunch up the edge warp strands by decreasing the cross sectional area of said marginal edges, the shrinkage being sufficient to harden said marginal edges as rigid extensions of the tape body.

References Cited

UNITED STATES PATENTS

| | | | |
|---|---|---|---|
| 781,407 | 1/1905 | Dornan | 139—415 X |
| 1,487,508 | 3/1924 | Brown | 139—384 |
| 2,672,168 | 3/1954 | Walters | 139—383 |
| 2,943,380 | 7/1960 | Suckle | 161—86 |
| 2,977,076 | 3/1961 | Byrne et al. | 244—110 |
| 3,148,710 | 9/1964 | Rieger et al. | 139—415 |
| 3,220,216 | 11/1965 | Byrne et al. | 244—110 |
| 3,228,745 | 1/1966 | Gacatioto | 156—85 X |

MILTON BUCHLER, *Primary Examiner.*

B. BELKIN, *Assistant Examiner.*